(12) United States Patent
Grieskamp et al.

(10) Patent No.: US 7,444,622 B2
(45) Date of Patent: Oct. 28, 2008

(54) ACCESS DRIVEN FILTERING

(75) Inventors: Wolfgang Grieskamp, Redmond, WA (US); Wolfram Schulte, Bellevue, WA (US); Nikolai Tillmann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1095 days.

(21) Appl. No.: 10/650,297

(22) Filed: Aug. 27, 2003

(65) Prior Publication Data

US 2005/0050391 A1 Mar. 3, 2005

(51) Int. Cl.
G06F 9/45 (2006.01)
(52) U.S. Cl. ...................................................... 717/124
(58) Field of Classification Search ................. 717/124; 714/38
See application file for complete search history.

(56) References Cited

U.S. PATENT DOCUMENTS

| | | | |
|---|---|---|---|
| 5,771,474 A * | 6/1998 | Matt et al. ..................... 701/29 |
| 5,781,720 A * | 7/1998 | Parker et al. .................. 714/38 |
| 6,083,276 A | 7/2000 | Davidson et al. |
| 6,539,503 B1 | 3/2003 | Walker |
| 6,697,751 B2 | 2/2004 | Skingsley et al. |
| 7,017,148 B2 | 3/2006 | Kumar et al. |
| 2003/0126136 A1 | 7/2003 | Omoigui |
| 2005/0050519 A1 | 3/2005 | Schulte et al. |
| 2005/0114771 A1 | 5/2005 | Piehler et al. |
| 2005/0120276 A1* | 6/2005 | Kolawa et al. ................ 714/38 |
| 2006/0179383 A1 | 8/2006 | Blass et al. |

OTHER PUBLICATIONS

Börger et al., "A Mathematical Definition of Full Prolog," In Science of Computer Programming, vol. 24, 35 pages, 1994.
Börger et al., "Correctness of compiling Occam to Transputer code," Computer Journal, vol. 36, No. 5, 43 pages, 1993.
Gaul et al., "Practical Construction of Correct Compiler Implementations by Runtime Result Verification," In Proceedings of SCI'2000, International Conference on Information Systems Analysis and Synthesis, 6 pages, 2000.
Goodenough, "Ada Compiler Validation: An Example of Software Testing Theory and Practice," In A.N. Haberman and U. Montinari, editors, System Development and Ada, vol. 275 of Lecture Notes in Computer Science, pp. 195-232, Springer-Verlag, 1986.

(Continued)

*Primary Examiner*—John Chavis
(74) *Attorney, Agent, or Firm*—Klarquist Sparkman, LLP

(57) ABSTRACT

A test domain configuration module generates graphical user interfaces for identifying information about desired tests such as data types and domain configurations, and collects information used by other modules to generate tests. The identified information may include, for example, an abstract syntax, a static semantic, max counts on instances of data types, or costs of field accesses or data types for max path costs or max expression costs. A test input generator, generates test input for the identified and configured data types. In one case, the generated test inputs are generated as tree data structures. A predicate determines whether a generated test input follows semantic conditions. A test input evaluator counts instances of data types in, sums paths through, or sums total costs of, the generated test inputs. A test acceptance module saves test inputs acceptable to the predicate and the test input evaluator.

28 Claims, 17 Drawing Sheets

OTHER PUBLICATIONS

Gurevich, "Evolving Algebras 1993: Lipari Guide," In Egon Boerger, editor, Specification and Validation Methods, Oxford Press, 26 pages, 1995.

Hunter, et al., "Combining RDF and XML Schemas to Enhance Interoperability Between Metadata Application Profiles," ACM 1-58113-348, pp. 457-466, 2001.

Kahan et al., "Annotea: An Open RDF Infrastructure for Shared Web Annotations," ACM 1-58113-348, pp. 623-632, 2001.

Le Métayer et al., "Verification by Testing for Recursive Program Schemes," In LOPSTR'99 (International Workshop on Logic Program Synthesis and Transformation), Lecture Notes in Computer Science, 18 pages, Springer, 1999.

Muchnick, "Advanced Compiler Design and Implementation," Morgan Kaufmann, San Francisco, 2000.

Pnueli et al., "The Code Validation Tool (CVT)," Software Tools for Technology, 10 pages, 1999.

"TinyLanguage, a Tutorial on generating test cases using Access Driven Filtering (ADF)," white paper, 19 pages, undated.

Wasserman et al., "Software Reliability via Run-Time Result-Checking," Journal of the ACM, 44(6):826-849, 24 pages, 1997.

Wolfgang Grieskamp, Yuri Gurevich, Wolfram Schulte and Margus Veanes; "Generating Finite State Machines from Abstract State Machines"; © 2002 ACM; pp. 112-122.

Chandrasekhar Boyapati, Surfraz Khurshid, and Darko Marinov; "Korat: Automated Testing Based on Java Predicates"; International Symposium on Software Testing and Analysis, Rome, Italy, Jul. 23, 2002; 14 pages.

Darko Marinov and Sarfraz Khurshid; "TestEra: A Novel Framework for Automated Testing of Java Programs"; 16th IEEE Conference on Automated Software Engineering (ASE 2001), San Diego, CA; pp. 22-31.

Kim et al., "Design and Implementation of Home Network Systems Using UPnP Middleware for Networked Applicances," IEEE Transactions on Consumer Electronics. vol. 48, Issue 4, Nov. 2002, pp. 963-972.

UPnP Implementers Corporation, "UPnP Device Certification Process Document," Version 1.0, 2001, 31 pages.

* cited by examiner

FIG. 3

```
abstract structure Exp ◄────314
  case Const ◄────306
    val as Integer
  case Bin ◄────308
    op as Op
    left as Exp ◄────302
    right as Exp ◄────304
  case Let ◄────310
    name as Name
    def as Exp
    body as Exp
  case Var
    name as Name enum Op
  Add
  Sub type Name = String
```

FIG. 4

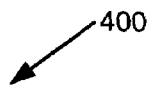

```
structure Exp
  public override ToString() as String?
    match me
      x as Const:
        return ToString(x.val)
      x as Bin:
        return "(" + x.left + ToString(x.op) + x.right + ")"
      x as Let:
        return "(let " + x.name + "=" + x.def + " in " + x.body + ")"
      x as Var:
        return x.name ToString(o as Op) as String?
  match o
    Add: return "+"
    Sub: return "-"
```

FIG. 5

Closed(e as Exp) as Boolean
    return Closed(e, {}) ←————510 type BoundedNames = Set of Name ←————512
Closed(e as Exp, ns as BoundedNames) as Boolean
    match e ←————502
        Const(_):   return true ←————504
        Bin(_,l,r): return Closed(l, ns) and Closed(r, ns) ←————518
        Let(n,d,b): return Closed(d, ns) and Closed(b, ns + {n})
        Var(n):     return n in ns ←————506

Eval(e as Exp) as Integer
    require Closed(e, {})
    return Eval(e, {->})

type Environment = Map of Name to Integer
Eval(e as Exp, env as Environment) as Integer
    require Closed(e, Indices(env))
    match e
        Const(v):   return v
        Bin(o,l,r): return Eval(o, Eval(l, env), Eval(r, env))
        Let(n,d,b): return Eval(b, env + {n -> Eval(d, env)})
        Var(n):     return env(n)

Eval(o as Op, l as Integer, r as Integer) as Integer
    match o
        Add: return l + r
        Sub: return l - r

BIN

| OP | VALUE | LEFT | VALUE | RIGHT | VALUE |
|---|---|---|---|---|---|
| 0 | ANY | 0 | ANY | 0 | ANY |
| 0 | ANY | 0 | ANY | 1 | CONST |
| 0 | ANY | 0 | ANY | 2 | VAR |
| 0 | ANY | 0 | ANY | 3 | BIN |
| 0 | ANY | 0 | ANY | 4 | LET |
| 0 | ANY | 1 | CONST | 0 | ANY |
| 0 | ANY | 1 | CONST | 1 | CONST |
| 0 | ANY | 1 | CONST | 2 | VAR |
| 0 | ANY | 1 | CONST | 3 | BIN |
| 0 | ANY | 1 | CONST | 4 | LET |
| ⋮ | ⋮ | ⋮ | ⋮ | ⋮ | ⋮ |
| 1 | ADD | 1 | CONST | 1 | CONST |
| 1 | ADD | 1 | CONST | 2 | VAR |
| ⋮ | ⋮ | ⋮ | ⋮ | ⋮ | ⋮ |
| 2 | SUB | 4 | LET | 3 | BIN |
| 2 | SUB | 4 | LET | 4 | LET |

```
abstract structure Exp
  case Const         ~1710
    val as Integer   ~1711
  case Bin           ~1720
    op as Op         ~1721
    left as Exp      ~1722
    right as Exp     ~1723
  case Let           ~1730
    name as Name     ~1731
    def as Exp       ~1732
    body as Exp      ~1733
  case Var           ~1740
    name as Name     ~1741 enum Op
  Add              ←─ 1750
  Sub type Name = String   ←─ 1760
```

1700

ACCESS DRIVEN FILTERING

TECHNICAL FIELD

The technical field relates to methods and systems for testing and verification of computer programs. More particularly, the field relates to managing inputs created for testing and verification of computer programs.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Reliability is of key importance to success of any software in the market. Users are easily deterred by a faulty software program. Thus, software developers expend a significant amount of resources to ensure their software is reliable. However, continued pressure on software developers to shorten software development cycles has placed on them an increased demand for making the process of software testing and verification more accurate and less time consuming. Furthermore, costs related to testing and verification has grown to represent a significant portion (50% by some estimates) of the overall cost of developing a piece of software. Thus, automation tools for testing and verification have grown to be more and more sophisticated over time.

One aspect of testing and verification of software (regardless of the type of automation) that is particularly challenging is the ability of a testing tool used to create input data to be used in testing. For instance, if a program accepts integer data as input, one method of testing might be to exhaustively test the software by applying virtually an infinite number of different integers. However, that is not only costly and time consuming but it also may be meaningless or impossible, since the complete set of integers is infinite. Thus, a tester may generate a more meaningful set of integers that would represent a thorough test without testing all integers. For instance, if Age is a field of the type integer then a meaningful domain for such a data member may be limited to integers ranging from 1-100. Such finitization is applicable to virtually any type of data. Thus, the process of testing can be vastly improved by managing the inputs used to manage testing of software programs.

However, manually identifying the various elements of a program and the data types they use and manually configuring inputs for testing can be time consuming, if not impossible. Thus, there is a need to automate the process of identifying the various data structure elements of a program to generate a meaningful set of data for testing and verification.

Furthermore, programs generally don't use data devoid of any context or relationship to other data. For example, most programming languages allow for defining data types and these data type definitions may be further used in defining particular data members such as data fields, and parameters of a program. For example, a person data type may include fields of name, height, weight, and date of birth. Thus, weight may appear not only as a data member of a class, but also as inputs to a method defined in a person class. In a program of any meaningful size there may be literally thousands, if not more, of such relationships and these relationships may also be more complex than the simple example provided above. Thus, there is a need for methods and systems that automate the process of creating inputs used for testing and verification of program and method behaviors.

BRIEF SUMMARY

The described technologies provide methods and systems for generating tests for testing computerized methods such as programs, APIs or compilers.

One example of the described technology provides a framework for defining data types, assigning costs, and configuring domains. A test developer then selects a test generation icon to create the tests for input to the language methods or a compiler of the language. A method recursively generates trees, and then calls a predicate with the tree as input, and the predicate returns true or false for the tree. An access vector is used to determine the point of failure, costs are summed, and data type uses are counted as the tree is built. Trees failed for any reason, are changed and built up recursively by varying data types. In one example, this continues until no enumerations exist that have not failed based on costs, counted instances, or the predicate. An access vector is checked to determine the focus of change.

In another example, one or more programs utilize described components or modules to create input for testing other programs. In one example, a test domain configuration module generates graphical user interfaces for identifying information about desired tests such as data types and domain configurations, and collects information used by other modules to generate tests. The identified information may include, for example, an abstract syntax, a static semantic, max counts on instances of data types, or costs of field accesses or data types for max path costs or max expression costs. An expression generator, generates expressions of the identified and configured data types. In one case, the generated expressions are generated as tree data structures. A static semantic determines whether a generated expression follows semantic conditions. An access monitor creates a vector of data accesses made by the static semantic in a generated expression. An expression evaluator counts instances of data types in, sums paths through, or sums total costs of, the generated expression. A test acceptance module saves expressions acceptable to the static semantic and the expression evaluator.

Additional features and advantages will be made apparent from the following detailed description, which proceeds with reference to the accompanying drawings.

BRIEF DESCRIPTION OF DRAWINGS

FIG. 3. is a program listing of an exemplary abstract syntax for the grammar of FIG. 1.

FIG. 4. is a program listing for converting an exemplary expression formed according to the abstract syntax of FIG. 3 into a string representation.

FIG. 5. is a program listing of an exemplary static semantic for verifying a closed condition for an expression formed according to the abstract syntax of FIG. 3.

FIG. 6. is a block diagram illustrating exemplary forms of domain configuration information.

FIG. 11. is a table of exemplary field assignment enumeration combinations for an exemplary data type.

DETAILED DESCRIPTION

Overview of Technology

Figure 1:
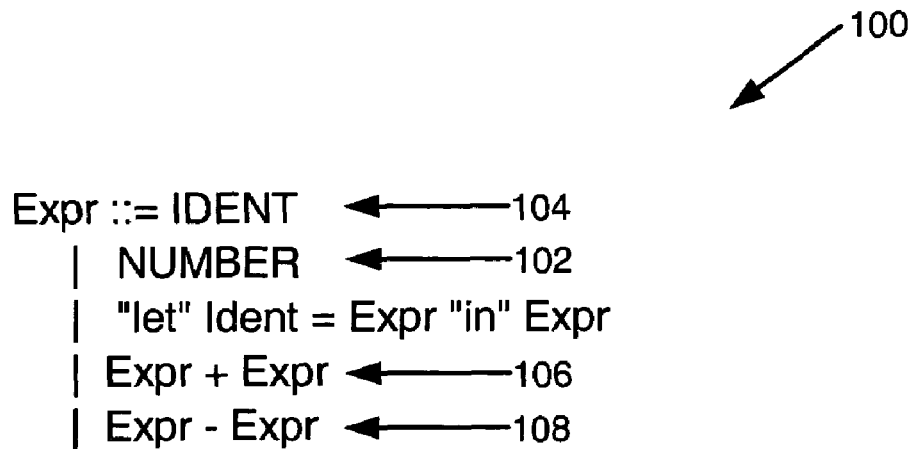
FIG. 1. is a program listing of a grammar for an exemplary language under test.

Generating test cases for an Application Programming Interface (API), involves finding interesting parameters (inputs) for each method and parameters are currently generated manually. In one respect, the described technology is an improved method for testing APIs that makes automatic test case generation possible. The overall size of the inputs is restricted for improved efficiency and a Boolean condition (the predicate) finds test cases that meet certain bounds.

The described technologies systematically search the input space of a method for interesting input parameters. API testing is one of the core problems of testing in general. The technology also finds parameters for language testing when source code or bytecode is viewed as parameters (input) to a compiler or interpreter (method) under test. In the compiler arts, a string of language constructs (e.g., source code) is received in serial form and parsed into a graph or tree. In one example, the technology creates strings for inputs to test such a language compiler or interpreter. In such a case, a string is the interesting input parameters created for language verification.

In one example, the technology generates strings for a compiler, or parameters for a method via a tree generator and a static semantic. The tree generator creates a tree that is tested for semantic conditions by the static semantic. After a tree tests positive on the static semantic, the input is serialized as input for testing a method or compiler under test.

Note that an input to a static semantic (predicate) can be an arbitrary object graph or tree. The object graph or tree can consist of instances of several data types. For example, compilers for new languages can be systematically tested using the described technologies. Compiler testing requires the generation of language inputs. Today, most test cases are either written by hand or are randomly generated. Instead, the described technologies are able to exhaustively find test cases that are accepted by a boolean predicate condition within certain bounds.

The concept of automatic testing based on predicates is not new. See Boyapati, et al., "Korat: Automated Testing Based on Java Predicates," MIT Laboratory for Computer Sciences, presented at the International Symposium on Software Testing and Analysis, on Jul. 23, 2002, in Rome, Italy (hereafter "Korat"). However, Korat fails to describe certain enhancements that make automatic test case generation feasible.

In its abstract, Korat states that given "a predicate and a bound on the size of its inputs, Korat generates all (nonisomorphic) inputs for which the predicate returns true."In Korat, the inputs (i.e. the parameters) are bounded by restricting the number of instances of each possible data type in the inputs.

In one example, the technology restricts a potentially infinite search space for generating testing input. In one example, a tree generator constructs a tree of tree of data elements as an input to a program, such as a method, an API or a compiler. If the method is a compiler, the tree is language constructs that are parsed into a tree or graph data structure. Starting from the root of the graph or tree inputs, a method assigns costs to the links of the graph. A test developer sets a maximum cost as input to the method, and the costs of data elements are summed as the graph is built. In another example, a method monitors the predicate as it accesses data elements, and sums the costs of elements accessed by the predicate. In one example, the method sums the costs of a path through the element. In another example, the method sums the costs for plural paths through the tree. In one example, the global bound is enforced by a module monitoring the execution of the predicate and recording data accesses made by the predicate. As the data nodes of the tree are traversed by the predicate via the links, the global costs are summed for each node. The global bound on costs effectively allows restricting overall size of the inputs, in addition to, or instead of, restricting the number of instances of particular data types.

Additionally, Korat only deals efficiently with object graphs, but not trees (i.e., connected, non-cyclic graphs). In order to specify a tree in Korat, a user has to code the non-cyclic-check himself as part of the predicate. In Korat, the condition that the graph must be a tree must be encoded in the context sensitive predicate. Thus, a significant effort and resources monitoring the predicates execution is now concerned with the tree check in Korat.

Instead, the technology described herein provides non-cyclic graphs (trees), by adding only not-seen-before instances of a data type to an existing tree, thereby providing that no new cycles are introduced.

Korat dictates that each generated graph may only include a certain number of instances of each data type. Although this prevents an infinite search space, the combinations of graphs grows exponentially with the number of data types. However, limiting data types or instances may unnecessarily preclude the generation of certain input expressions.

Additionally, the technology described herein distinguishes two categories of complex data types, namely, classes and structures. The technology starts with an initial input. In one example, this initial input is defined by the test developer. In another example, this initial input is constructed by considering non-recursive data types where possible. Then the technology varies this initial input by varying the fields of the instances that are already part of the previously generated input. In one example, when an expression generator varies a field of an already generated expression, a class or a structure can be introduced in place of the field. If a class is selected, an already used instance of a class may be introduced in its place. If an already used instance of a class is introduced (e.g., a node already in the generated tree), this may introduce a cycle between instances of classes. Whereas, if the expression generator introduces a new, not yet used instance of a class into the graph, then no cycles are introduced, and the graph is extended by another node. As with classes, if the expression generator, generates a new, not used instance of a structure, then no new cycles are introduced. In this way, non-cyclic expressions are created.

Korat works for generating test data for object-oriented base class libraries (BCLs). Typical features of BCLs are that the inheritance hierarchy is shallow, BCLs don't use many abstractions, and BCLs can typically be tested with a small number of different objects (since they don't rely on existing infrastructure).

However for language models these constraints do not hold. The definition of abstract syntax trees (ASTs) typically results in a large number of "classes", all related by inheritance. For generating reasonable ASTs, many different nodes are often needed, along with ASTs that not only vary in depth but also in breadth.

However the main data structure for programming language semantics are ASTs, for which isomorphism checks can be performed much faster than for arbitrary object graphs. Finally, semantics live on a higher abstraction level than BCLs. For example, semantics deal with sets of bound and free variables, or with environments that map names to locations.

The described technologies extend Korat in several ways. For example, the technology limits the search space by not only putting bounds on the number of instances of a data type used, but also on the maximal number of field accesses. Fields which are accessed after the limit has been reached are no longer varied. As a consequence, the technology generates more variations in program breadth, which works particularly well for language testing. In another example, the technology distinguishes object graphs from trees, and detects isomorphism of trees in an efficient way.

The semantics of modem languages is often split into phases. The first phase of the static semantics is typically name resolution, in which names are bound to definitions. Next comes type-checking, which makes sure that operations are only applied on correctly typed values, and finally the AST is compiled. The dynamic semantics is often given as an interpreter working on the fully resolved and type-correct AST. Thus, the described technology first generates syntactically correct parameters and programs (as inputs), which exposes all name-resolution errors distinguished by the specification. Next, parameters or programs which pass name resolution process are checked by the semantics to expose type errors.

A careful look at static and dynamic semantics, determines that it is the structure of the semantics that distinguishes correct from incorrect programs. For instance, when the types of two operands of a binary operator are not of the required type, the type checking semantics will generate an error. However, if the required types agree, another execution path is taken. Test case generation thus becomes a path sensitizing problem. In one case, if 100% branch coverage of the specification is reached, test case generation terminates.

Preferably, the semantics from which test cases should be generated, is given in the Abstract State Machine Language (AsmL). AsmL is a model-based executable specification language. Since the described technology does not require any specific language, ASML will be used in the following discussion.

This technology generates inputs for methods as text in strings, or as trees. A compiler takes programs as input and decides whether the program syntax and semantics are correct or not, and then reduces the program to executable or bytecode. So generating language inputs is useful for testing the correctness of compilers.

For example, this technology is useful for XPATH which is a language used to navigate through nodes in an XML tree. XPATH provides the ability to move back and forth between nodes of an XML tree, and provides contra-structures for altering tree traversal. Thus, this technology is useful for generating trees that are submitted directly to XPATH to make sure XPATH processes the tree inputs as expected.

In general, given a description of a grammar, it is desirable generate all the possible trees of the grammar for testing. However, not all possible trees are desirable. This technology introduces a "filtering" process that generates only those trees desirable according to a definable situation. Thus, desirable trees are described by a filter predicate, and further governed by other factors such as summing the costs to reach nodes of a tree. Additionally, by building trees recursively based on number of data types, and global costs, the number of unacceptable trees built is reduced. The described technology allows filtering as trees are built instead of building all possible trees and throwing away unacceptable trees.

The following describes how to automatically generate test cases using the technology by means of an example called Tiny Language (TL). Tiny Language is a relatively simple language for describing arithmetic expressions. The test cases generated are expressions of this language.

OVERVIEW OF AN EXEMPLARY LANGUAGE UNDER TEST

FIG. 1 is a program listing 100 of an exemplary grammar for Tiny Language, where IDENT and NUMBER are terminals and other terminals are enclosed in quotes.

Figure 2:
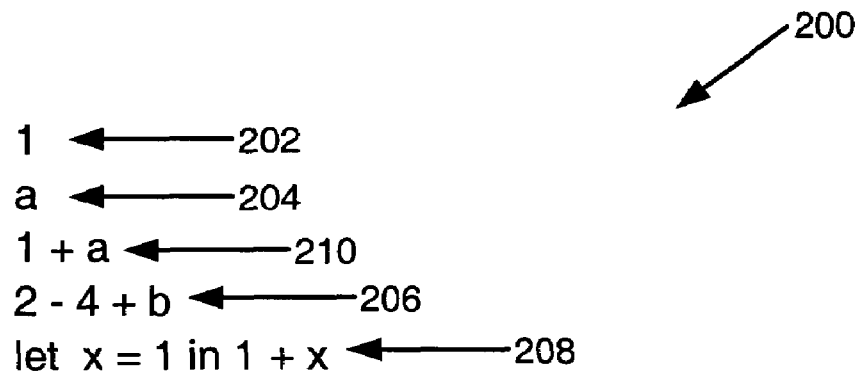
FIG. 2. is a program listing of exemplary statements formed according to the grammar of FIG. 1.

FIG. 2 is a program listing 200 of exemplary legal expressions formed according to the Tiny Language grammar of FIG. 1. For example, the first expression 202 is formed according to the grammar 100 as a NUMBER 102. The second expression 204 is formed according to the grammar as an identifier 104. The third expression 206 is formed recursively according to the grammar as a combination of two expressions, respectively 106, 102 and 104. Naively, these expressions could be generated by just enumerating the strings from the grammar. However languages are typically not context free, but have context conditions.

For example, a language may require all input expressions to be closed. In this example, closed means that every identifier must be defined before it is used. Under this expression requirement, only the first and last expressions 202, 208 would qualify as closed expressions. If input expressions were limited to expressions that meet the closed requirement, then the first and last expression would be context correct while the other expressions would contain context errors. For example, the second expression 204 is not closed because "a" is not an assigned identifier (i.e., it has no value assigned to it). Similarly, the third expression and the fourth expression have no values assigned to identifiers a and b, respectively. Context conditions are best described as attribute grammars or in more general terms as predicates over the abstract syntax of a language.

Thus, when using this technology for generating inputs for testing, in one example, instead of generating thousands or millions of potentially illegal expressions (e.g., program string method calls, etc.), test generation may proceed differently. First, an abstract syntax (e.g., FIG. 3) of the language is provided to test as an abstract data type. Using this abstract syntax, an expression generator will generate instances (e.g., trees) of this data type (e.g., as discussed in relation to FIG. 10). Second, a static semantic (i.e., a predicate) of the language (e.g., FIG. 5) is used to test whether a generated expression follows some semantic condition (e.g., testing whether an expression is closed). In one example, the expression is generated in memory as a tree. Additionally, in one example, the predicate is instrumented with binary code, so as the predicate accesses the nodes of the tree (i.e., the bounded data types and fields), the instrumented binary code counts the bounded data type accesses and/or sums costs assigned to graph edges. Thus, while the predicate checks the tree in order to determine whether the it is formed according to the predicate, data accesses are checked in order to determine whether the tree meets the set domain requirements such as maximum data type instances or the maximum total costs for each edge path through summed edges. Third, an exemplary printing method (e.g., FIG. 4) is shown for printing the abstract data type according to the concrete syntax of well formed expressions 202, 208. This exemplary method 400 can also be used once a well formed expression is created, to return the generated input expression into source code (e.g. a file) as a valid test case for input to a compiler (i.e. to serialize the generated trees as normal strings of the concrete syntax). Additionally, an interpreter method (i.e., a dynamic semantic) is provided (e.g., FIG. 6) for evaluating an expression if desirable. Finally, an interface (e.g., FIGS. 19-22) is provided for describing an input domain, for example, how many instances of a particular data type/field should be maximally generated, along with semantic choices for the semantic carrying terminals and nodes that appear in the abstract syntax tree, and for assigning costs to edges between nodes of the tree for summing costs (e.g., FIG. 13).

Exemplary Abstract Syntax

FIG. 3 is a program listing of an exemplary abstract syntax provided to test as an abstract data type. In one example, this abstract syntax is used by an expression generator, to generate expression instances (e.g., trees) following the pattern of this data type. An abstract syntax of a language is a data type that represents the essential parts of the derivation tree of the concrete syntax. For instance the abstract syntax does not include unnecessary lexical information, so the "let" and "in" terminals are removed from the grammar 100. The terminals IDENT and NUMBER remain in the abstract syntax 300 since they carry meaning. In one example, using the abstract syntax, the concrete expression "1+7" is reduced to "Bin (op=Add, left=Const(1), right=Const(7))"This expression can be represented in memory as a tree data structure.

Figure 7:
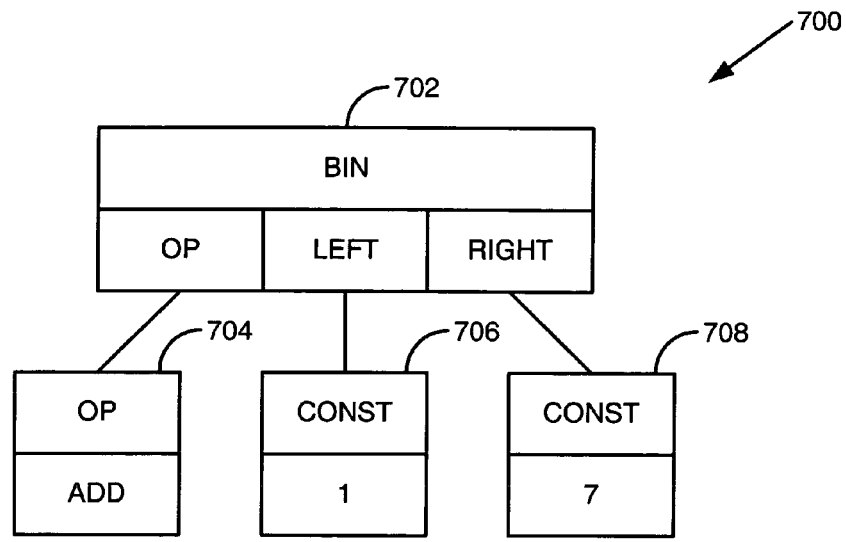
FIG. 7. is a diagram of an exemplary tree data structure of a Bin data type language construct.

FIG. 7 is a diagram of an exemplary tree data structure 700 of a Bin language construct. The tree includes a Bin data type node 702, and the Bin data type includes three fields "op," "left," and "right." The op field points to an OP data type node 704, and the Op data type is an enumerated type that can be assigned "Add" or "Sub". The left field points to a Const data type node 706, and the Const data type includes one field of an Integer type. The right field points to a Const data type node 708 with Integer type field. Notice however, that the left 302 or right field 304 of the Bin data type may also point to any other expression. Thus, according to the expression definition 314, the left and right fields of the Bin data type can point to Const nodes 306, Bin nodes 308, Let nodes 310, and Var nodes 312. Thus, the abstract syntax 300 would allow the recursive generation of infinitely large trees.

Figure 8:
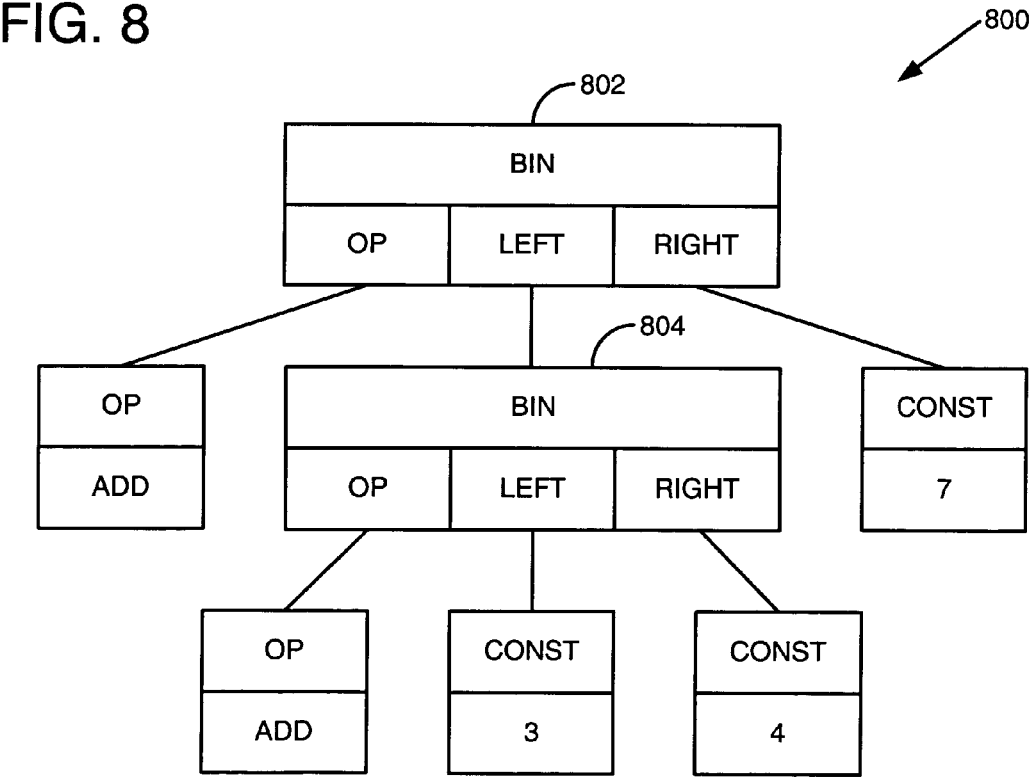
FIG. 8. is a diagram of an exemplary tree data structure of a nested Bin language construct.

FIG. 8 is a diagram of an exemplary tree data structure 800 of a nested Bin language construct. In this example, the left field of the Bin node 802 points to another Bin node 804. This tree data structure represents the concrete expression "3+4+7".

Exemplary Expression Generation

Figure 9:
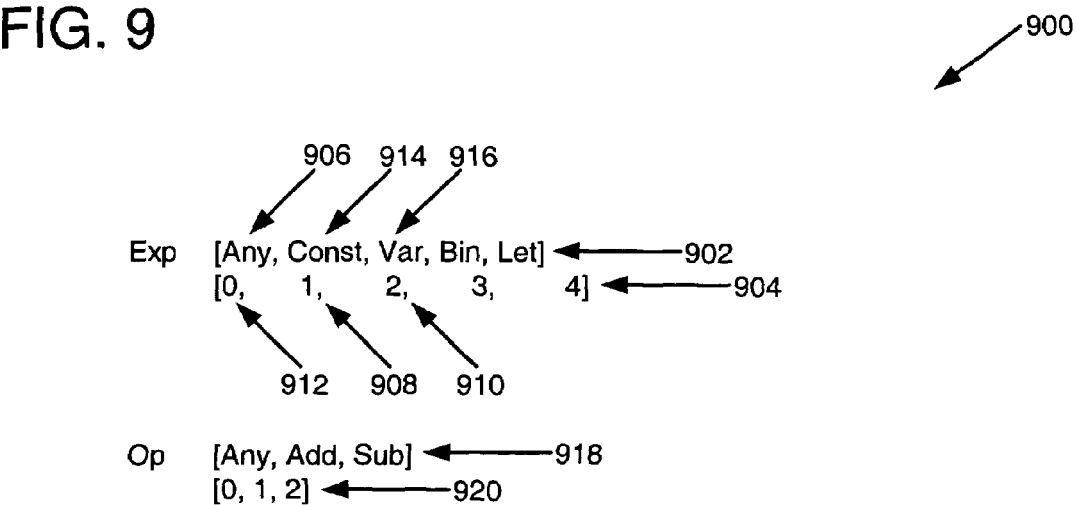
FIG. 9. is a diagram of an exemplary assignment of enumeration values to language constructs.

FIG. 9 is a diagram 900 of an exemplary assignment of values to language constructs for expression generation. The tree generation builds a tree and then invokes the predicate 500 on the tree as it grows. A tree that satisfies the predicate (i.e., an acceptable tree), is saved and/or used as input to a compiler or other method under test. If desirable, the tree can be returned to a concrete syntax with an appropriate method (e.g., 400). Of course, the technology does not require the expressions to be represented in memory as trees. The expressions could be built and the predicate could be designed to accept expression strings as input. If the expressions are built as strings, then a parser could be used to build the expression into a tree if the predicate requires trees.

In one example, an expression generation method builds a tree one node at a time and then calls the predicate with each tree to see if the tree is closed. For an orderly exploration of expressions, data types of an expression set 902 are assigned an enumerated order 904 (i.e. Exp (Any=0, Const=1, . . . Let=4) and Op(Any=0, Add=1, Sub=2)). The enumerated order can be used to keep track of an orderly exploration of an expression space. Since an expression 314 starts with a Const, Var, Bin, or Let data type 306-312, if a node is presently at Const, an increment of one through the enumerated data types will next test a Var node.

In one example, a expression generation method starts with an unacceptable data type called "Any" 906. Since "Any" is not an acceptable case for the exemplary expression 314 it is not expected by the predicate. Thus, "Any" provides a start state that verifies a failure case.

Figure 10:
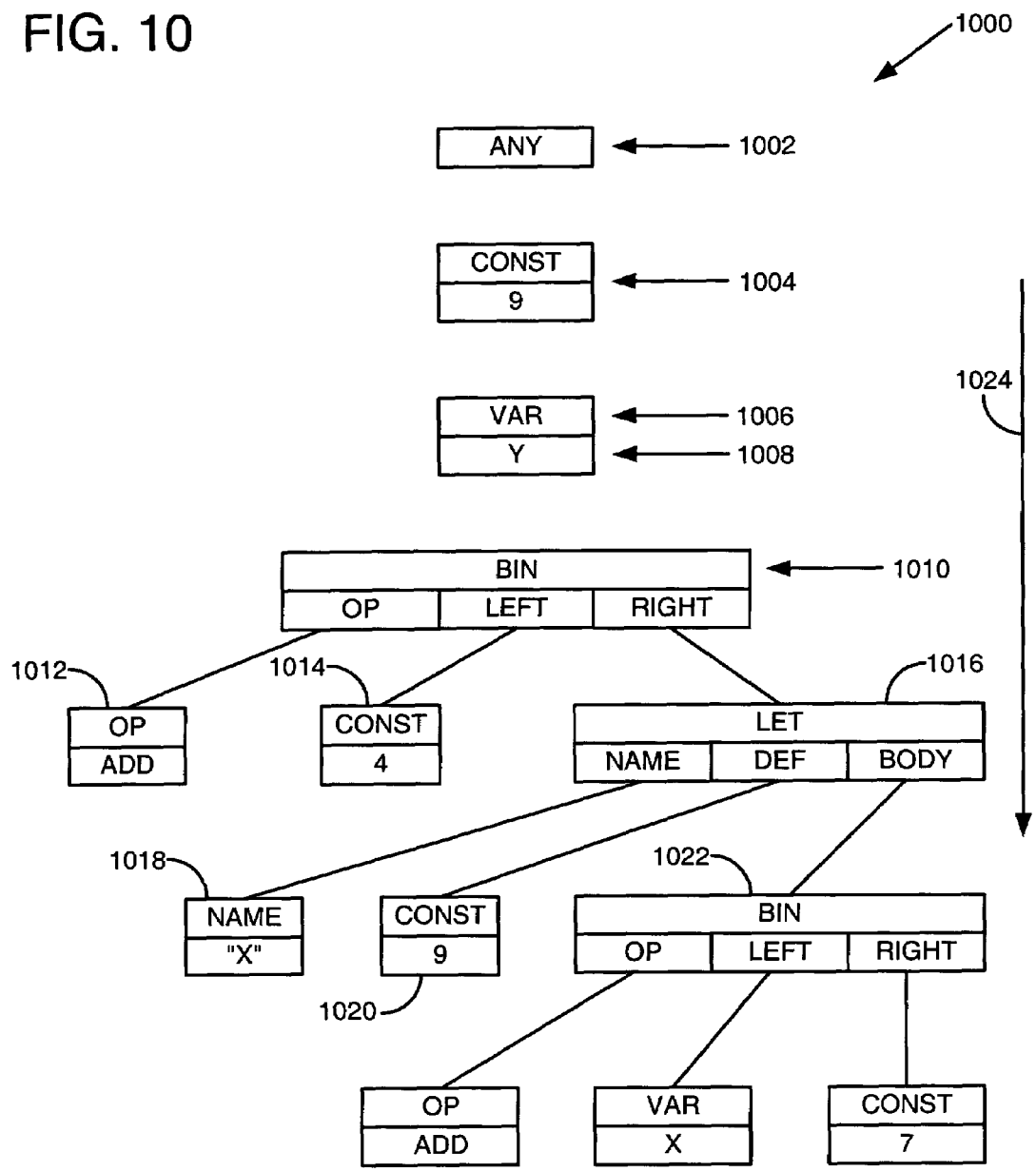
FIG. 10. is a diagram of plural exemplary generated trees.

FIG. 10 is a diagram of plural exemplary generated trees. In this example, expression generation starts with the Exp(0) enumeration node 912, 906 which is the Any data type node 1002. The test generation method then invokes the predicate 500 with the new tree expression 1002 (i.e., Closed(Exp)). The predicate is unable to match 502 the "Any" data type, so the predicate fails the tree 1002. The tree generation method then increments the enumeration Exp(1) 908, 914 and obtains the Const data type for a new tree 1004. The test generation method then invokes the predicate 500 with the new tree expression 1004. Notice that the Const tree field includes a integer value of "9." In one example, domains assigned to fields of language constructs such as Const, Var, or Name, are provided via the methods and systems discussed in U.S. Patent Application Ser. No. 10/650,238 entitled "Interactive Domain Configuration," which is incorporated herein by reference. Since the method matches 502 the Const data type, the predicate returns true for the Const tree 1004. Thus this tree can be written (e.g., 400) to a file(s) of valid trees. If desirable, different integers can be assigned to this Const node 1004 and tested by the predicate, and each closed tree saved for testing. In such a case, enumerating interesting integers (e.g., Integer (0)=−1, Integer(1)=0, . . . Integer(11)=127,000) can be used for the orderly exploration of Const trees.

The tree generation method then increments the enumeration, Exp(2) 910, 916 and obtains the Var data type for a new tree 1006. The test generation method then invokes the predicate 500 with the new tree expression 1006. In this case, the predicate is able to match 502 the "Var" data type 506, and the predicate returns the Boolean value of the expression "n in ns" 506. Notice that in this predicate, the bounded name set called "ns" 512, starts out as empty "{ }" 510, and variable names are only added (i.e., ns+{n}) 516 in the second "Closed( )" call 514 of a "Let" match 508. Thus, in this case, since "y" is not in "ns", the Boolean statement returns false, and this tree is not added to the test list.

The tree generation method then increments the enumeration to Exp(3), and obtains the Bin data type for a new tree 1010. In this case, the Bin node has field pointers to other data type nodes in the fields "op," "left," and "right." Since the "op" field of the Bin points to operator data types, the test generation creates an Op node 1012. The Op node possible values 918 are enumerated 920 to help simply orderly test generation. In this example tree, the Op node 1012 is assigned the Op(1) enumeration value which is the "Add" value. Here it is assumed that the Op node has already enumerated the Op(0) value of "Any" and failed by the predicate. Additionally, since the left and right fields of the Bin node 1010 can point to any Exp data types 902, these data types are each tested accordingly for each field. In this example, the node pointed to by the left field of the Bin node 1010 has enumerated through the Exp(0)="Any"node to the present Exp(1) =Const node 1014 now shown. It is also assumed that the node pointed to by the right field of the Bin node 1010 has enumerated through the Exp(0)="Any", Exp(1)="Const", Exp(2)="Var", Exp(3)="Bin", to arrive at the present data type node of Exp(4)="Let" 1016. To develop a visual understanding of the recursive nature of an exemplary language expression abstract syntax 300, the "Let"node 1016 is shown with exemplary nodes pointed to by its "name" 1018, "def" 1020, and "body" 1022 fields. Note that since the "def" and "body" fields of the Bin node are defined as expressions themselves, the possible set of trees is infinite.

FIG. 11 is a table of field assignment combinations for an exemplary Bin data type. As previously shown, a domain of inputs 918 is enumerated 920. This enumeration provides a way to systematically explore 1100 inputs for an exemplary data type 1102. However, this table represents the entire input space, and yet it is already known that many of these input combinations will fail. For example, any expression containing an "Any" field assignment will fail, and a field assignment of an unbounded "Var" will also fail. Thus, it is desirable to fail trees sooner instead of creating all tree possibilities 1100. Thus, using the predicate along with several other techniques, the number of trees generated is reduced.

Exemplary Static Semantic

FIG. 5 is a program listing for an exemplary static semantic. In this example, the static semantic 500 checks whether all variables are "previously bound" to a value. Additionally, this predicate matches 502 data types recursively via the different kinds of "Closed( . . . )" calls made based on the switch on the match function 502. However, this closed function is merely an example of thousands of variations of methods that could be used to verify semantic conditions for expression formations based on any given language. Other static semantics could perform many other checks such as order of data types, field assignments, and other expression formations. The exemplary static semantic starts with an empty list of bounded names, and examines an input expression.

The exemplary static semantic 500 recursively walks over the input expression, examines the tree branches, collects bound names, and verifies that all variables used in an expression have been previously bound. As the static semantic recursively accesses the tree, a data structure (e.g., an access vector, list, table, etc.) is maintained as nodes of the tree are accessed by the static semantic.

Knowing the last node or leaf of the tree that was accessed is valuable for several reasons. For example, the last access identifies where the tree needs to be changed if a failure occurred. Given the node or leaf that failed the tree, that input can be changed to see if another input would make the tree acceptable. (e.g., check to see if the next enumeration defined for that type makes the tree acceptable). Additionally, if the tree is acceptable, it is still desirable to check whether enumerations of the field that was accessed last are also acceptable.

Exemplary Access Vector

Figure 12:
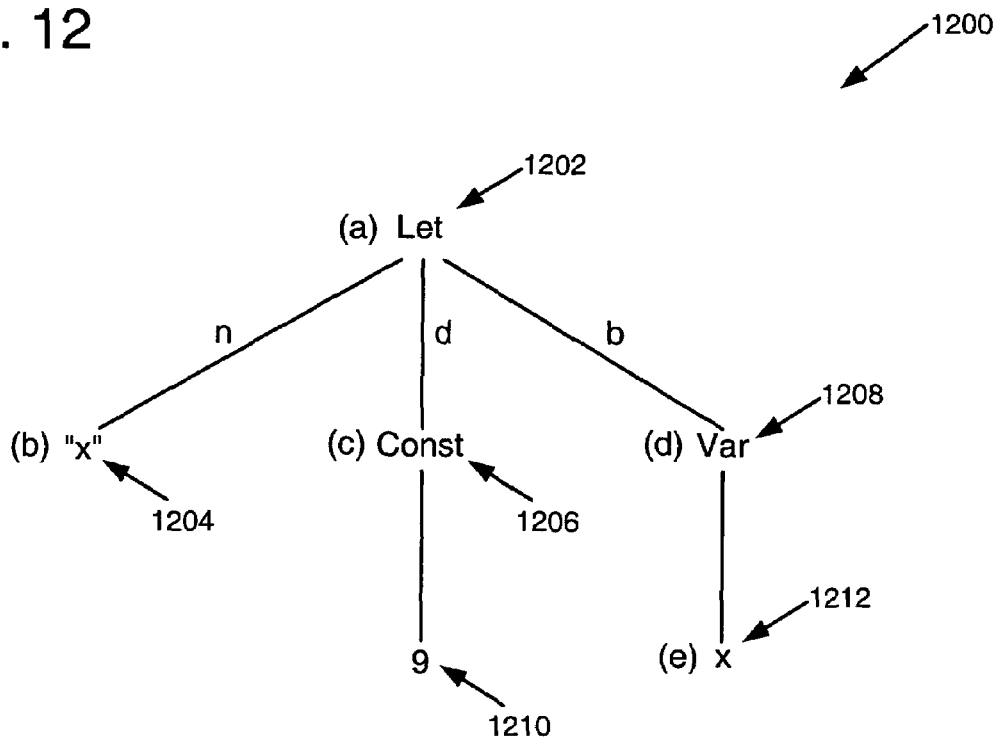
FIG. 12. is a diagram of a tree used to illustrate an exemplary access vector.

An access vector is an order of data types of the tree visited by the static semantic. For example, given an expression "(let x=9 in x)", formed according to the Tiny Language grammar, an exemplary abstract representation of the statement is Let ("x", Const(9), Var("x")). According to the abstract structure of an expression 300, for the Let data type 310, the name field is assigned "x," the def field is assigned Const(9), and the body field is assigned Var("x"). Although many variations are possible, in one example, a tree generator generates this exemplary statement as shown in FIG. 12. Assuming the static semantic (i.e., predicate) is designed to receive a tree as input, the tree would be accessed in a certain pattern. The pattern of access would vary according to how the predicate is written and implemented to traverse a tree. However, so long as the same traversal method is used (e.g., depth-first, breadth-first, etc), between tree iterations, the access vector will contain relevant information.

Thus, the exemplary tree 1200 is accessed by the predicate. Initially, the Closed method is called with the entire tree 1200. The closed method 508 accesses the "Let"node 1200 in order to read the "Let" value for the match statement 502. Thus the first access in the access vector is called "(a)" and represents this "Let" access. Next, because of the match on Let 508, the closed method calls itself twice 518. In order to make the two calls 518, the method has to access the fields of the Let data type in order to name the fields "n," "d," and "b," as shown in the two calls 518. Thus, the second access in the access vector is called "(b)" and represents this access to "x" 1204 required for assignment to the "n" parameter 518. The third access in the access vector is called "(c)" and represents the access to "Const" 1206 required for assignment to the "d" parameter 518. The fourth access in the access vector is called "(d)" and represents the access to "Var" 1208 required for assignment to the "b" parameter 518. Once the assignments are made to the input parameters, the two recursive calls are made as shown 518.

The first recursive call to "Closed(d, { })" contains the d parameter which is assigned the "Const" node 1206. The method accesses the "Const" node again in order to match Const 502. This would represent the fifth access to the tree, and could be recorded on the access vector if desirable. However, in this example, since this portion of the tree was already accessed, adding this second access would provide no additional information about acceptability, so it is not added to the access vector. Additionally, since this static semantic does not care about the value of the Const parameter Const (i.e. Const (_)), the "9" 1210 is not accessed, and thus, not added to the access vector.

The second recursive call to "Closed(b, ns+{n}) 518 contains the "b" parameter and the "n" parameters. The access to "n" could be recorded on the access vector if desirable. However, in this example, this portion of the tree was already accessed, adding this further access would provide no additional information about acceptability, so it is not added to the access vector. The method accesses the "Var"node 1208 again in order to match Var 502. This would represent the sixth access to the tree, and could be recorded on the access vector if desirable. However, in this example, since this portion of the tree was already accessed, adding this second access would provide no additional information about acceptability, so it is not added to the access vector. However, the match on "Var" 506 checks to see whether or not "x" is bounded (i.e., "n" in ns"), and this accesses the value 1212 of Var to see if it is in "ns." Since "n"was placed in "ns" above 518, the statement returns true 506. Thus, this access is recorded in the access vector as "(e)" and represents the "x" access 1212.

In this example, the access vector represents the following accesses: [(a)="Let," (b)=""x"," (c)="Const," (d)="Var," and (e)="x"].

If the tree is going to fail by being rejected by the predicate, it is desirable to fail early, preferably even before the whole tree is generated. This is why it is desirable to build the tree one node at a time. In this case, the predicate returned true because the tree was well formed. However, if "Var" had been assigned the value "y" (e.g., Var("y")) in the example tree 1212, then the final access (e) would have failed, and "y"could be varied. Through enumerating through data types or assignments, "y" would eventually be replaced with "x," thereby rendering an acceptable tree.

In general, it is desirable to focus on the last access, because when it fails, any sub-trees that exist lower in the tree from the failure can be ignored. In this way, by recursively building acceptable trees, a potentially infinite input space is reduced to a manageable size. Until a branch of a tree is acceptable (e.g., 1016) it is not relevant or effective to generate inputs (e.g., 1022) lower in the tree. Rather as each node of the tree is verified, the size of the tree is incrementally built (e.g., 1024). This avoids generating sub-trees that will never be reached because they have an unacceptable node above them in the tree.

Thus, tree generation starts by enumerating through assignable data types, and stops on failure, and makes enumerated changes at the point of a last access in an access vector. Additionally, for acceptable trees, the last access is varied to the next possible value, in order to find other acceptable variations of an acceptable tree. Nodes or leaves that are acceptable are saved for test, and provide a basis for finding additional trees. Nodes or leaves that are unacceptable, provide a focus of change for finding an acceptable variation. The access vector is useful in focusing on a point of input change, and enumerating is a way to determine a next assignment for change.

Exemplary Cycle Management

In Korat, a predicate was used to discover cycles in a generated tree. Thus, the predicate must check the entire tree for cycles before other predicate conditions are examined. This results in an access vector which contains already possible fields in no particular order. Thus there is no focus for further variation. Given the number of trees in contention, this solution is resource intensive and therefore prohibitive.

Instead, in this technology a tree is represented in structures and tree generation does not create cycles that are possibly introduced by reusing objects. In this technology, tree generation proceeds with selecting new structures, instead of pointing back into an existing graph.

However, it may be desirable to have cycles in a graph. In one example, cycles are allowed when desirable for a graph generation. Using the technology described herein, during configuration, a flag is set that represents that a data type is class and/or should allow cycles during graph generation. Additionally, if cycles are not allowed, then a cycle detection method is provided by a test designer. Such cycle test methods are known in the arts, and generally involve traversing links in a graph and marking nodes already visited.

Exemplary Limit on Data Types

Korat provided for limiting the number of instances of objects in method parameters generated for tests. This limit provided a way to assure mixes of objects for method parameter inputs. However, for languages with many object types, the number of test cases quickly explodes. However, a limit on the number of instances of data types may still provide value in some contexts.

Using Tiny Language as an example, a tree generation could be limited to 10 instances of Bin, 5 instances of Let, 7 instances of Const, and 3 instances of Var for each tree generated. This domain restriction test configuration information could be obtained from a test developer via a GUI, file, or other input method. This technique may also be referred to as "local bounds."

Exemplary Costs Affecting Tree Behavior

Figure 13:
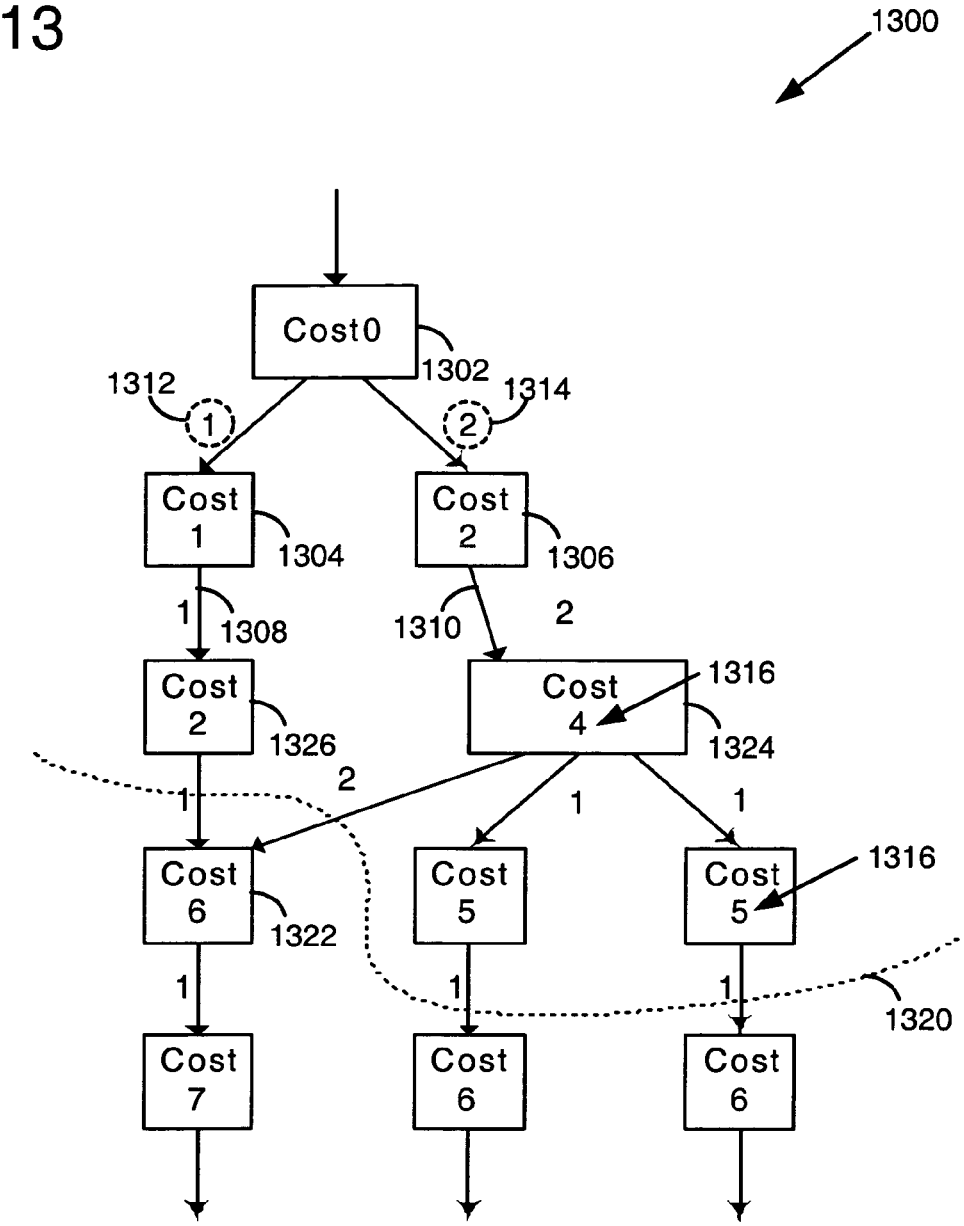
FIG. 13. is a diagram of a graph illustrating an exemplary sum of tree path costs.

FIG. 13 is a diagram of an exemplary graph 1300, illustrating a sum of global costs for nodes. The nodes of the graph 1302, 1304, 1306, etc., represent instances of certain data types. The links 1308, 1310, etc., between the nodes are labeled with an associated defined cost 1312, 1314, etc. Within each node, the total cost to reach the node is shown 1316, 1318, etc. In this case, the maximum global bound is defined as 5, so nodes within that bound are included in a generated input graph, whereas nodes that would exceed the maximum bound are not allowed. This distinction is represented by the dotted line 1320. Additionally, in this example, there is a node 1322 with two incoming links. In this case, the total cost assigned to a node may depend on the order in which the predicate accesses the links. In one example, since the node was first accessed through the right node 1324, the node would not be included in the input. In another example, the node 1322 would be included in the input as accessible through a node 1326 with an allowable total cost.

In one example, the search space is restricted by cost bounds. A cost is assigned to the edges of the object graph, and a bound can be given on the maximally accumulated cost ("MaxCost") along each path. In one example, this maximum bound is enforced by closely monitoring the execution of the predicate and recording every data access. MaxCost restricts the overall size of the inputs, rather than just the number of instances of particular data types (or both restrictions can be simultaneously in place).

In the example graph 1300, what is called global cost is actually a sum of costs down each path of the graph. In this example, path cost sum 1318 should not exceed 5. MaxCost is helpful, for example, to create tress that are relatively uniform in nature.

In another example, in may be desirable to allow a tree to be long in one area, and short in other areas. This can be accomplished in a number of ways. For example, the global costs could be a bound placed on the sum of all paths, thereby allowing a tree to generate deep in one area, and short in others. In this case, a global cost is a cost of all paths through the tree. Of course, in some cases, it may be valuable to assign a maximum-path-cost and a maximum sum of all paths cost. The first could limit path sizes while the second limits overall tree size.

Depending on the way the predicate is written, it will access some node (the "root") of the graph first, and then it may access other nodes by following the fields of the instance represented by the root node until the global costs for each path or sum of paths has been reached.

Additionally, it may be desirable to assign zero costs to certain nodes or leaves. This would be helpful, for example, in allowing a tree to add any missing leaves even after a local or global sum has been reached.

By applying different costs to trees via test configuration information, an arbitrary line that cuts off the tree growth is created. For example, costs might avoid trees that are heavy on one side or the other, if desirable. For example, with recursive data types such as Bin or Let, by assigning higher costs to expressions assigned to one side of a binary operator, a tree generation can be forced into one direction (e.g., Cost(Bin.left, [ Bin=5, Let=5, Const=1, Var-1 ]) and Cost(Bin.right, [Bin=1, Let=1, Const=1, Var=1]). By assigning higher costs to the left direction, the path MaxCost is quickly reached on left branches. This can be useful in cases, where allowing trees to grow in both directions produces symmetric behavior that adds nothing more to the test cases. Thus, by assigning Bin=1 as a cost to the right side of Bin data types, the tree can grow inexpensively to the right. But since growth to the left is expensive, trees that vary only by symmetry can all be built on one side.

In another case, costs may "progressively" be assigned to certain data types or fields to weight their aggregate appearance in trees. For example, the first ten Bin data types built into a tree are free, but then each additional Bin data type increments progressively—the eleventh Bin costs 1, the twelfth Bin costs 3, the thirteenth costs 8, and etc.

Exemplary Variations for Bounding Trees

As previously stated, a predicate function may sum or count data types in conjunction with testing conditions of the static semantics. However, the summing costs of or counting of data types may also be done by the tree generation method while the tree is created or before the predicate is called on the created tree. Additionally, the predicate can be instrumented (e.g., injected with executable instructions) that monitor data accesses, count data types, and sum path and or total tree costs. Variations on the context of modules performing these techniques are within the scope of thought.

Exemplary Cost Assigning Functions

Figure 14:
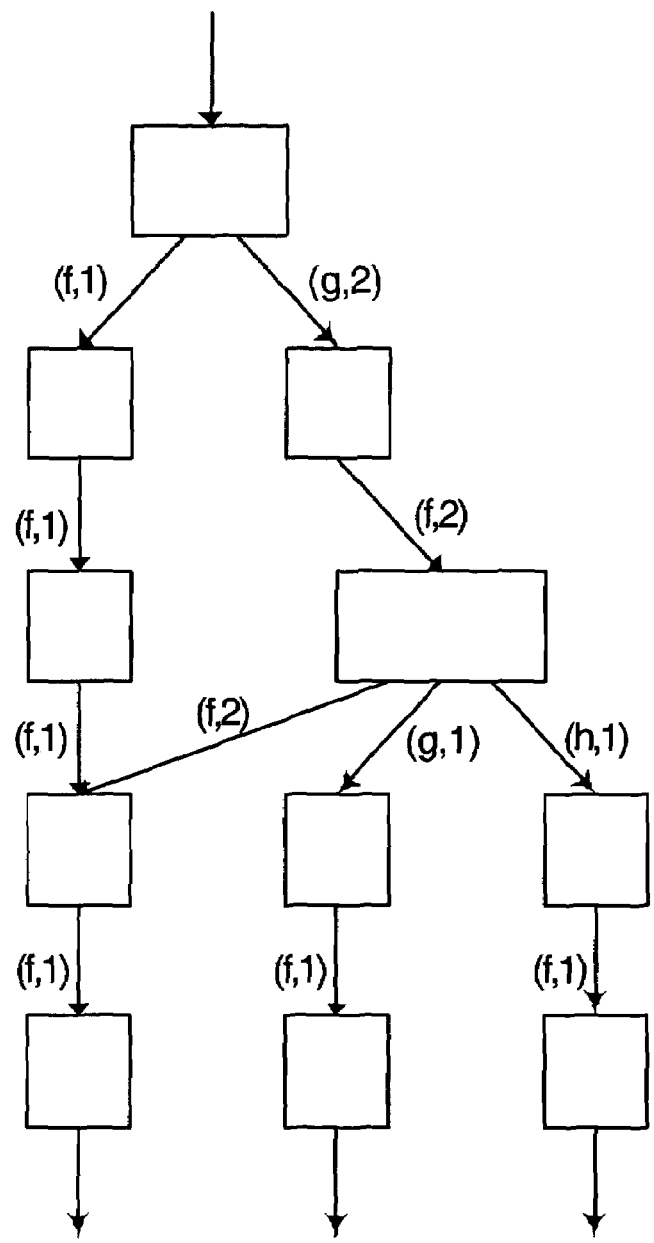
FIG. 14. is a diagram of a graph illustrating exemplary functions for obtaining edge costs.

FIG. 14 is a diagram of an exemplary graph 1400 illustrating labeled directed edges. As the input graph is accessed, an access graph is built. The nodes of the access graph are all the nodes of the input graph that are accessed by the predicate. As shown, there is a directed edge (x, y) with the label (f, c) in the access graph if there is a field access x.f that yields y where f is a field name and c the access cost for the edge of the input graph which represents the field f of x.

Starting from the root, the predicate inspects the nodes through field accesses in a certain order. According to this order, costs accumulate (starting at zero) along the directed edges. When the MaxCost of the method is exceeded, the method cuts off the generation of the graph when a next access would exceed MaxCost. This global maximum for each graph path access, greatly reduces the search space. A sum of all paths may be computed instead of, or in addition to, a maximum path cost.

Expanding Language Requirements

In addition to the other uses, distributed computing friendly languages require customized language interpreters and compilers for verifying traversing XML databases and schemas. These languages often have many varied language constructs comprising many different and varied data types and expression semantics. As the number of data types increase, the number of test cases explodes. Limiting the number of instances of each data type will create trees of mixed data types, but trees can still become very deep. By placing path cost sums on the tree, a tree fails sooner based on costs, thereby causing it to enumerate through other data types because of the failures. After the tree fails in one area (for any reason including costs) and enumerates through variations at the failed area using the access vector to focus change, enumeration eventually moves the focus to another part of the tree. For example, in FIG. 11, an exemplary enumeration focuses on the right most field in the Bin data type, and then enumerates one data type in the field to its left before returning to focus on the right field to enumerate through each data type in the right field enumerations. Requiring success in one part of the tree before building the tree larger eliminates building many trees that would never be acceptable.

Using the described technologies, these languages can be created and tested for very specific schemas or XML databases. A language developer (e.g., via test information configuration) generates a grammar, creates an abstract syntax, creates a predicate, assigns costs, creates trees, and serializes the trees for input for testing the compiler or interpreter created for the new language, or for testing inputs to methods of an API.

Exemplary Test Generation Scenario

A tester writes the data types and configures the data types with a domain of input values for exploration. The described technologies provide the framework for defining a test domain such as data types, assigning costs, and configuring domains. The tester then selects a test generation icon to create the tests for input to the language methods or a compiler of the language. The test generator starts by creating a very small tree (possibly just one node, or possibly a user defined acceptable start tree). The test generation technique then calls the predicate with the tree as input, and the predicate returns true or false for the tree. An access vector is used to determine the point of failure, costs are summed, and instance uses are counted. Trees failed for any reason, are changed and built up recursively by varying data types. In, one example, this continues until no enumerations exist that have not failed based on costs, counted instances, or the predicate. The access vector is checked to determine the focus of change whether after a success or failure.

Exemplary System of Test Input Generation

Figure 15:
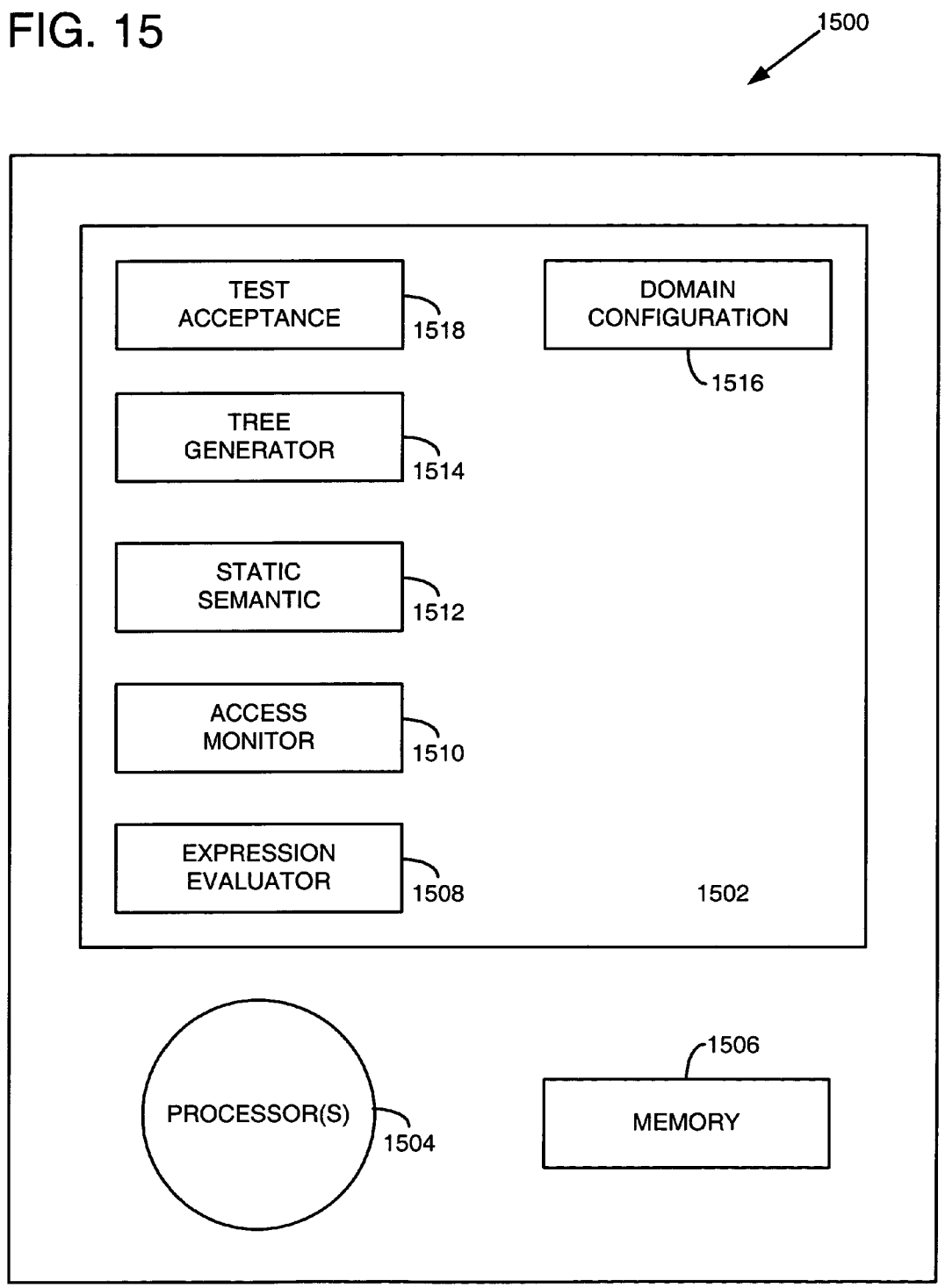
FIG. 15. is a block diagram illustrating exemplary system of modules for generating test inputs.

As shown in FIG. 15, a computer system 1500 includes a hard drive memory 1502, one or more processors 1504, and main memory 1506. The processor(s) 1504 execute programs which include instructions data and/or state. One or more programs execute modules 1508-1516 that create input 1518 for testing other programs. A module is a function method component, thread, or process that performs a described service. In one example, a test domain configuration module 1516 generates graphical user interfaces for identifying information about desired tests such as data types and domain configurations, and collects information used by other modules to generate tests. The identified information comprising an API, an abstract syntax, a static semantic, max counts on instances of data types, or costs of field accesses or data types for max path costs or max expression costs. An expression generator 1514 generates expressions of the identified and configured data types. In one case, the generated expressions are generated as graph data structures. In another case, the graph data structures are tree data structures. However, the generated input could also be in strings. A static semantic 1512 determines whether a generated expression follows semantic conditions. An access monitor 1510 creates a vector of data accesses made by the static semantic in a generated expression. An expression evaluator 1508 counts instances of data types in, sums paths through, or sums total costs of, the generated expression. A test acceptance module 1518 saves expressions acceptable to the static semantic and the expression evaluator.

Exemplary Method of Test Generation

Figure 16:
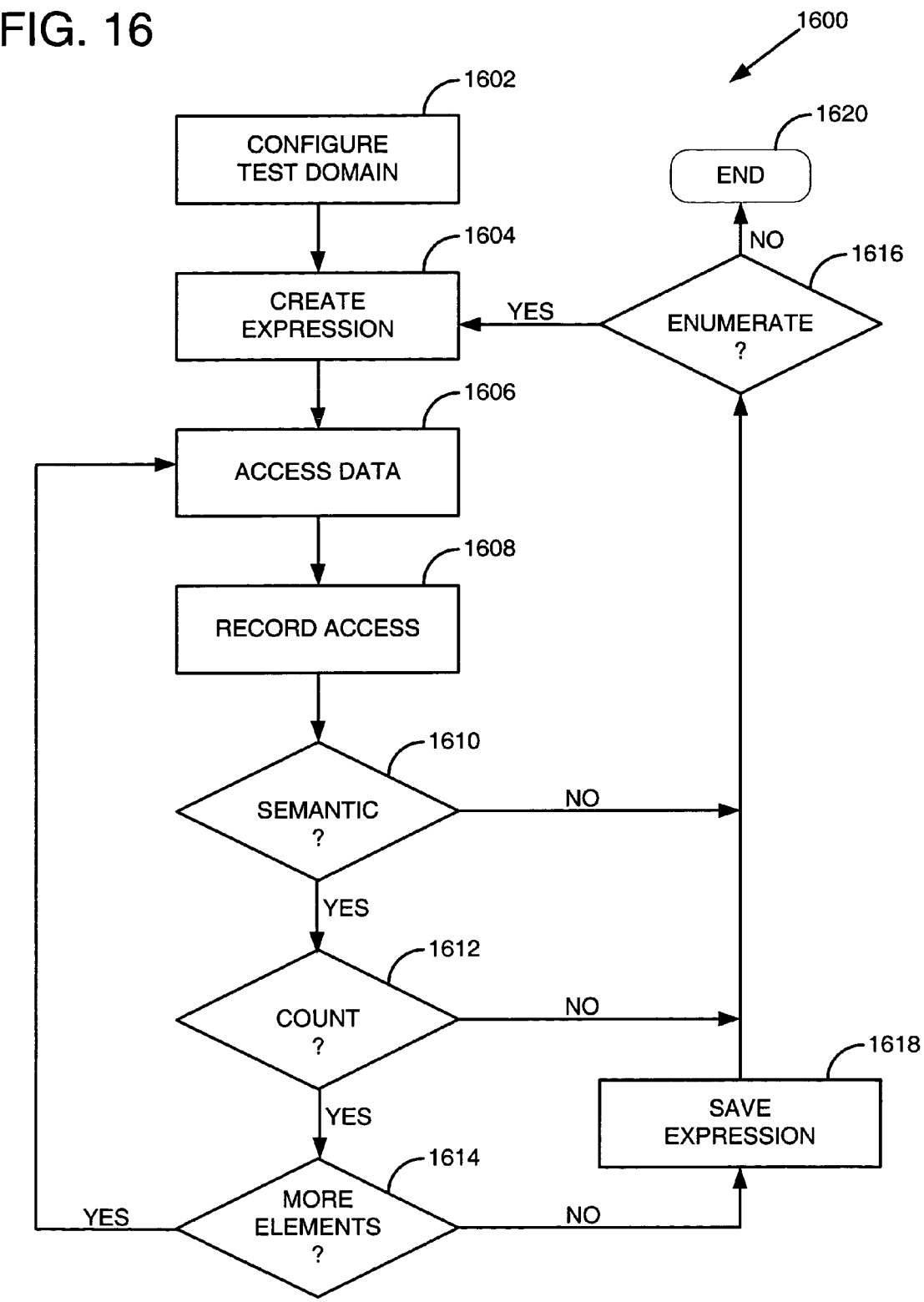
FIG. 16. is a flow chart of an exemplary method of generating input expressions.

FIG. 16 is a flow chart 1600 for an exemplary method for generating inputs for testing a method or program.

At 1602, a graphical component receives test domain information. In one example, the test domain configuration information includes an API or language under test along with data type assignments. In another example, the information includes data types and domain configurations, and information used to generate tests. The identified information could include an API, an abstract syntax, a static semantic, max counts on instances of data types, or costs of field accesses or data types for max path costs or max expression costs.

At 1604, an expression is created according to the test domain information. In one example, the expression is created as a tree data structure, in another example, the expression is a string.

At 1606, a next data element of the expression is accessed.

At 1608, the data element access is recorded in a data structure (e.g., an access vector).

At 1610, a static semantic is used to verify a semantic of an accessed data element. If the static semantic does not fail on a data element, then the costs of the data element are considered 1612. If the static semantic fails a data element, then the method proceeds to enumerate on the last recorded access 1616.

At 1612, a data element is counted. If the count exceeds allowed instances of the element, the method proceeds to enumerate 1616. If costs of access path is monitored the data element is added to the path costs, and checked against allowable path costs. If total expression costs are monitored, the data element costs is added to total expression costs. If any costs exceeds allowable costs, the expression return for enumeration 1616. If counts and or costs are acceptable, the expression is checked for a next data element 1614.

At 1614, an expression is checked for more data elements. If the expression includes another data element, the method returns to access the data element 1606. If the expression is empty, then last data element was acceptable to both the static semantic 1610 and any cost conditions 1612. Since the expression is an acceptable expression, the method saves the expression 1618.

At 1618, the expression is saved for testing a program. After the expression is saved, the method returns to enumerate 1616.

At 1616, the method enumerates to a next data type identified by enumerating on the last access recorded in an access record. If a next enumeration exists for the configured domain, then the method returns to generate a next expression 1604 based on the previous expression with an enumeration. If no enumerated variation of the prior expression exists, then test generation is completed 1620.

Figures 17, 18:
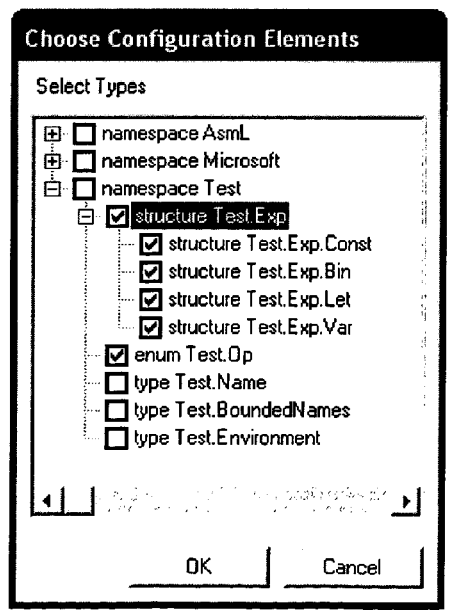
FIG. 17. is a listing of an exemplary definition for the data type of Exp (expression) along with its members.
FIG. 18. is a diagram of a graphical user interface element presenting various data structure elements of a program available for data domain configuration.

Exemplary Configuration of a Data Domain Using a Graphical User Interface to Provide Domain Configuration Information The configuration of the data domains for the data type Exp (FIG. 17) and its component elements (e.g., its methods and fields) with the use of a user interface to provide the domain configuration information. FIG. 17 illustrates a definition of a data type of Exp (expression) 1700. It is an abstract data type comprising of several sub-types Const 1710, Bin 1720, Let 1730, and Var 1740. Each of the sub-types 1710, 1720, 1730, and 1740 have their own fields. The sub-type Const 1710 has the field val 1711 which is of the data type Integer. The sub-type Bin 1720 comprises of the fields op 1721 of the data type Op, left 1722 of the data type Exp, and right 1723 of the data type Exp. The sub-type Let 1730 comprises of the fields name 1731 of the data type Name, def 1732 of the data type Exp and body 1733 of the data type Exp. Lastly, the sub-type Var 1740 has a single field of name 1741 of the data type Name. The data types Op and Name are defined at 1750 and 1760 respectively. Since the fields of some of the sub-types of data type Exp are themselves of the data type Exp this data type is a recursive case. A data type definition such as the one at 1700 may be provided in a program's code.

A test tool reads a reflection of program code (e.g., data types, abstract syntax, or etc.) to generate a user interface element such as the one show in FIG. 18. As shown in FIG. 18, the user interface provides a list data types, sub-types, methods, fields, parameters and other data structure available for configuring their data domains. Using the user interface 1800, the data structure elements may be chosen for configuring their data domains. In this case only the data type Exp 1700 and its sub-types (1710, 1720, 1730 and 1740) have been selected for domain configuration.

Figure 19:
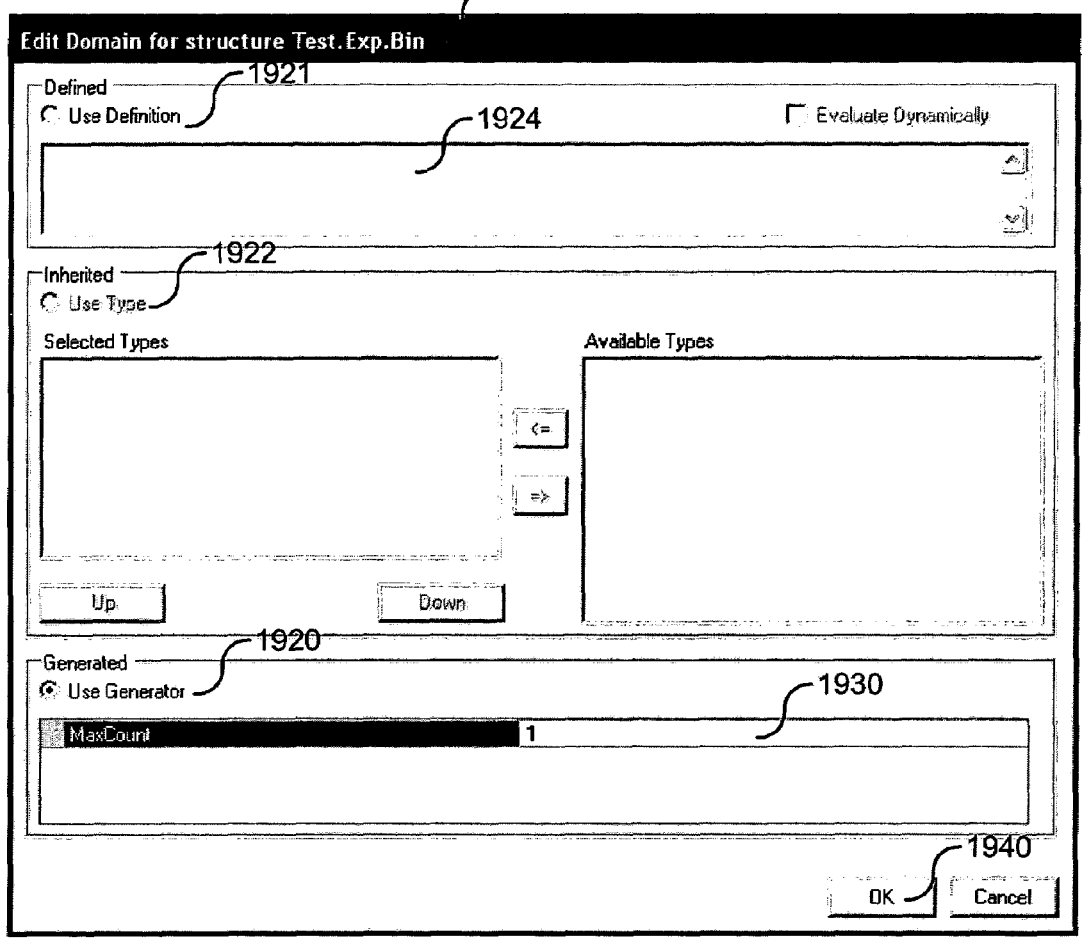
FIG. 19. is a diagram of a graphical user interface element for receiving user input domain configuration information.

Another user interface element such as 1900 in FIG. 19 may be used to specify the domain configuration information to be used to produce a data domain for the selected data structure elements. For instance, the user interface element 1900 indicates that it is receiving user input for configuring the data domain for the sub-type Bin 1910. The selector window 1930 may be used to select various properties that may be associated with a Bin data type. For example, the Bin data type may include per instance costs, maximum allowable instances of Bin, or costs of different types of field assignments for different data types for Bin field accesses. Once the domain configuration information is entered the 'OK' button 1940 may be selected.

Figure 20:
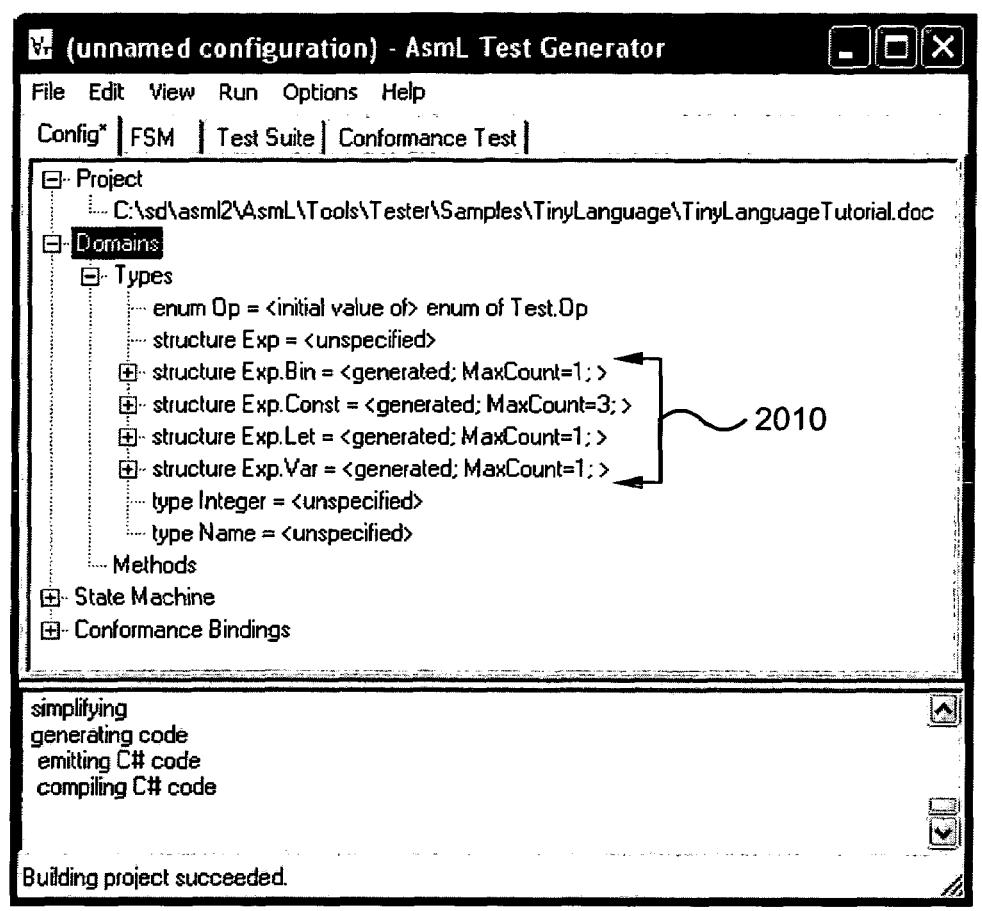
FIG. 20. is a diagram of a graphical user interface element indicating the current state of data domain configuration for selected data structure elements after receiving the user input indicating their domain is to be configured by applying domain generation techniques.
Figure 21:
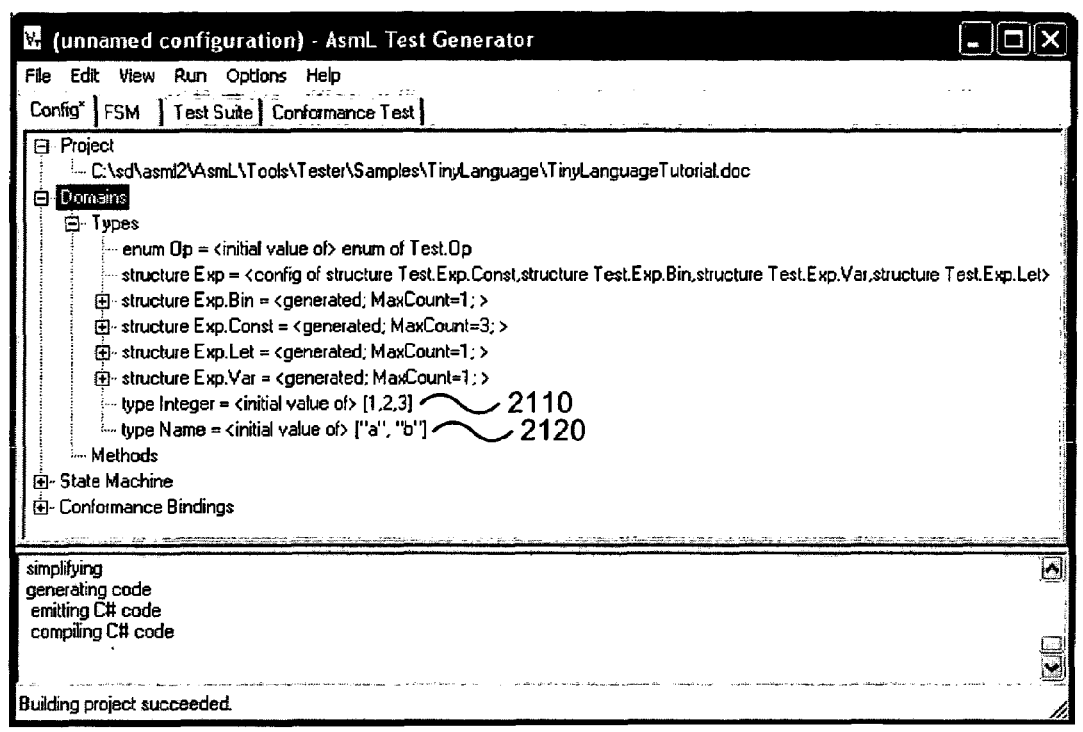
FIG. 21. is a diagram of a graphical user interface element indicating a current state for data domain configuration for selected data structure elements after the data domains for the atomic data types of Integer and Name have been expressly configured.

In FIG. 20, at 2010, the data domain of the sub-types Bin 1720, Const 1710, Let 1730 and Var 1740 are now indicated as being configured to be produced by the selected generation techniques.

The data type Exp 1700 is a complex data type comprising of multiple sub-types Bin 1720, Const 1710, Let 1730 and Var 1740. Thus, there are no values as such for the data type Exp other than the values of the sub-types Bin 1720, Const 1710, Let 1730 and Var 1740.

Besides configuring the data domains of the types whether they are data types or related sub-types the domains for the fields may be configured as well. For instance, the sub-types Const 1710, Bin 1720, Let 1730 and Var 1740 all have fields that whose data domains need to be configured. For instance, the field val at 1711 can inherit the data domain of its type the Integer, the fields name at 1731 and 1741 may inherit from the domain of the Name type and the field op 1721 from the domain of the Op type. The domain for the Op type is limited by the declaration at 1750 to be limited to 'Add' and 'Sub'. However, the data domains for the Name and Integer types have not been configured. Thus, the data domains for the atomic types Name and integer may be specified expressly by choosing the "Use definition" button 1921 and then entering an expression in the text box 1924. The expression can be any expression which enumerates a set of values whose elements are of the desired type. For Integers it has to be an enumeration of integers and for Name it has to be an enumeration of a strings. Using an expression to configure the data domain of atomic types Integer and Name may result in a domain configuration illustrated in FIG. 21. Here the data domain for the type Integer is configured expressly to be [1, 2, 3] at 2110 and the domain for the type Name is configured expressly to be ["a", "b"] at 2120.

Figure 22:
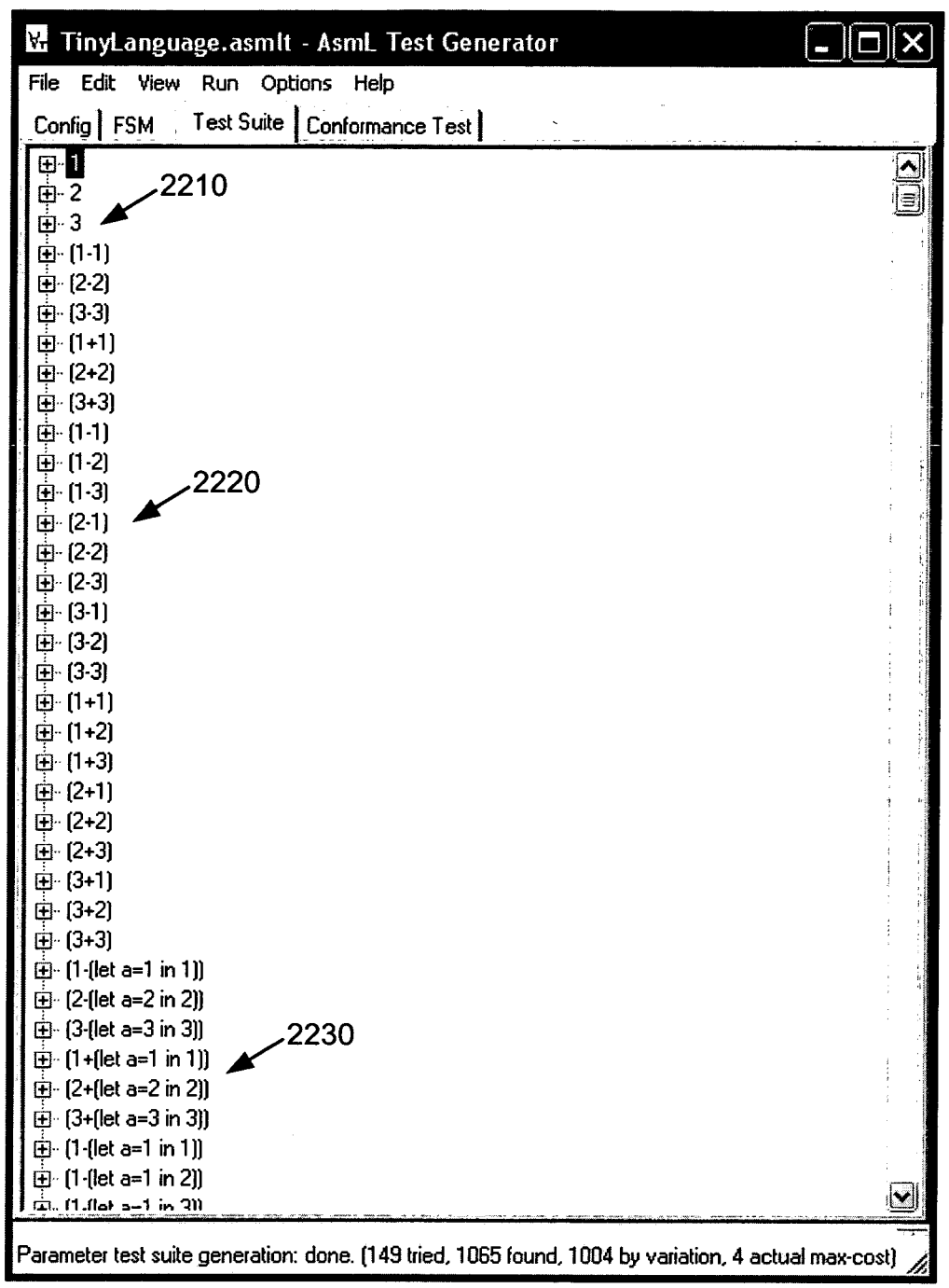
FIG. 22. is a diagram of a graphical user interface element indicating a data domain produced for an expression data type.

Once the domain configuration information is entered as shown using the exemplary user interfaces the information may be used to produce the data domains. An exemplary data domain for the data type Exp produced according to the data configuration information provided is shown in FIG. 22.

Computing Environment

Figure 23:
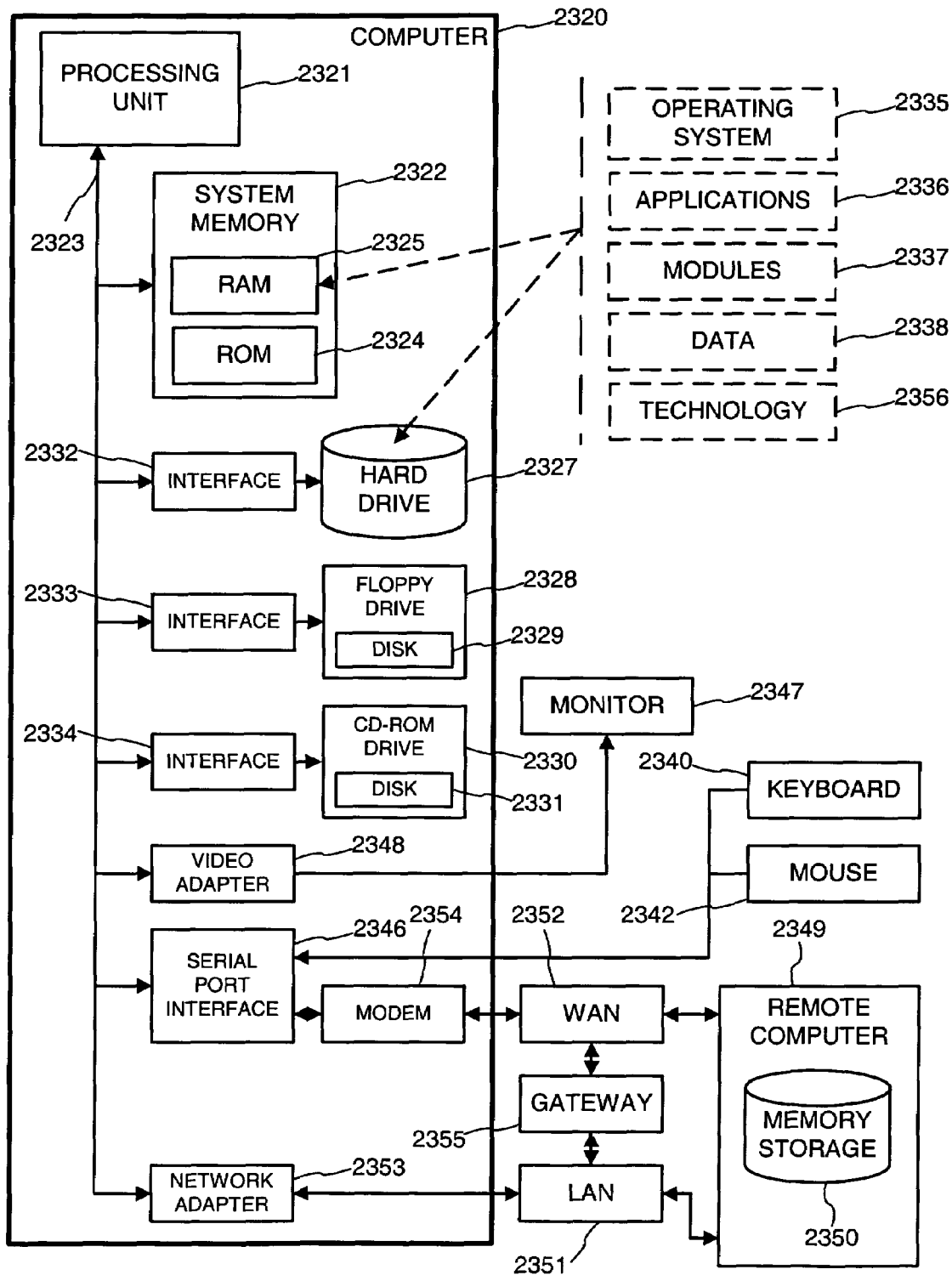
FIG. 23. is a block diagram of a distributed computer system implementing the described technologies.

FIG. 23 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc., that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 23, an exemplary system for implementation includes a conventional computer 2320 (such as personal computers, laptops, servers, mainframes, and other variety computers) includes a processing unit 2321, a system memory 2322, and a system bus 2323 that couples various system components including the system memory to the processing unit 2321. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 2321.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 2324 and random access memory (RAM) 2325. A basic input/output system (BIOS), containing the basic routines that help to transfer information between elements within the computer 2320, such as during start-up, is stored in ROM 2324.

The computer 2320 further includes a hard disk drive 2327, a magnetic disk drive 2328, e.g., to read from or write to a removable disk 2329, and an optical disk drive 2330, e.g., for reading a CD-ROM disk 2331 or to read from or write to other optical media. The hard disk drive 2327, magnetic disk drive 2328, and optical disk drive 2330 are connected to the system bus 2323 by a hard disk drive interface 2332, a magnetic disk drive interface 2333, and an optical drive interface 2334, respectively. The drives and their associated computer-readable media provide nonvolatile storage of data, data structures, computer-executable instructions, etc. for the computer 2320. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 2325, including an operating system 2335, one or more application programs 2336, other program modules 2337, and program data 2338; in addition to the described technologies 2356.

A user may enter commands and information into the computer 2320 through a keyboard 2340 and pointing device, such as a mouse 2342. These and other input devices are often connected to the processing unit 2321 through a serial port interface 2346 that is coupled to the system bus, but may be connected by other interfaces, such as a parallel port, game port or a universal serial bus (USB). A monitor 2347 or other type of display device is also connected to the system bus 2323 via an interface, such as a video adapter 2348. In addition to the monitor, computers typically include other peripheral output devices (not shown), such as speakers and printers.

The computer 2320 operates in a networked environment using logical connections to one or more remote computers, such as a remote computer 2349. The remote computer 2349 may be a server, a router, a peer device or other common network node, and typically includes many or all of the elements described relative to the computer 2320, although only a memory storage device 2350 has been illustrated. The logical connections depicted include a local area network (LAN) 2351 and a wide area network (WAN) 2352. Such networking environments are commonplace in offices, enterprise-wide computer networks, intranets and the Internet.

When used in a LAN networking environment, the computer 2320 is connected to the local network 2351 through a network interface or adapter 2353. When used in a WAN networking environment, the computer 2320 typically includes a modem 2354 or other means for establishing communications (e.g., via the LAN 2351 and a gateway or proxy server 2355) over the wide area network 2352, such as the Internet. The modem 2354, which may be internal or external, is connected to the system bus 2323 via the serial port interface 2346. In a networked environment, program modules depicted relative to the computer 2320, or portions thereof, may be stored in the remote memory storage device. It will be appreciated that the network connections shown are exemplary and other means of establishing a communications link between the computers may be used.

Alternatives

Having described and illustrated the principles of our invention with reference to the illustrated embodiments, it will be recognized that the illustrated embodiments can be modified in arrangement and detail without departing from such principles. It should be understood that the programs, modules, processes, or methods described herein are not related or limited to any particular type of computer apparatus. Various types of general purpose or specialized computer apparatus may be used with or perform operations in accordance with the teachings described herein. Actions described herein can be achieved by computer-readable media comprising computer-executable instructions for performing such actions. Elements of the technology described as software may be implemented in hardware and vice versa. In view of the many possible embodiments to which the principles of our invention may be applied, it should be recognized that the details are illustrative only and should not be taken as limiting the scope of the technology. Rather, we claim as our invention all such technology as may come within the scope and spirit of the following claims and equivalents thereto.

We claim:

1. A computerized method for generating inputs for testing computer programs, the method comprising:
    receiving test domain information;
    generating a test input according to received test domain information;
    invoking a predicate on the test input; and
    summing costs assigned to data elements of the test input.

2. The method of claim 1 further comprising determining from an access list of data elements traversed by the predicate, a last data element accessed in the test input.

3. The method of claim 2 further comprising varying the last data element accessed in the test input in response to determining the test input is acceptable.

4. The method of claim 2 further comprising varying the last data element accessed in the test input in response to determining the test input is unacceptable.

5. The method of claim 2 wherein the summed costs are costs of paths through data elements of the test input.

6. The method of claim 1 wherein the summed costs are costs of all data elements in the input.

7. The method of claim 1 wherein the summed costs are costs of data elements accessed by the predicate as it traverses the test input.

8. The method of claim 1 wherein the summed costs are costs of paths of data elements accessed by the predicate as it traverses the test input.

9. The method of claim 1 wherein the test input is generated as a tree data structure.

10. The method of claim 9 wherein the summed costs are costs assigned to edges between nodes representing data elements in the tree data structure.

11. The method of claim 1 wherein received test domain information is received via user interaction with a graphical user interface.

12. The method of claim 11 wherein test domain information received includes an abstract syntax, a predicate, a maximum number of allowable instances for a data type, and a cost indication for an edge between two data types.

13. The method of claim 1 wherein the predicate fails a tree that has an acceptable maximum allowable summed cost.

14. The method of claim 1 wherein an exceeded summed cost fails a tree that is acceptable to the predicate.

15. The method of claim 3 wherein the last data element varied, is varied based on a next enumerated data type.

16. The method of claim 1 wherein the predicate is instrumented with binary code to record an access vector and to sum the costs assigned to data elements.

17. The method of claim 7 wherein a data element is assigned a zero cost.

18. The method of claim 7 wherein a cost assignment function assigns progressively higher costs.

19. A computer system comprising:
    a computer memory having stored therein,
        a module for obtaining test configuration information,
        a module for generating test input based on obtained test configuration information,
        a module for traversing a generated test input with a predicate,
        a module for summing costs assigned to data elements of the generated test input, and
        a central processing unit for executing instructions of the modules.

20. The system of claim 19 wherein the computer memory further has stored therein a module for saving test cases acceptable to the predicate and summed costs.

21. The system of claim 19 wherein the computer memory further has stored therein:
    a module for recording data element accesses made in the generated test input; and
    a module for enumerating to a next data type from a last data type wherein the last data type was a data type of a data element in the generated test input.

22. The system of claim 21 wherein the next data type is a last data in a next test input.

23. The system of claim 19 wherein the module for obtaining test configuration information obtains assignments of costs to data types, a predicate, and a path maximum cost.

24. A computer program product embodied on computer readable media comprising executable instructions for performing a method comprising:
    generating a tree of data elements; invoking a predicate on the tree; recording data elements accessed as the invoked predicate traverses the tree; and summing costs of data elements accesses.

25. The computer program product embodied on computer readable media of claim 24 further comprising saving the tree as a string representation if the tree is accepted by the predicate and summed costs do not exceed a maximum cost.

26. The computer program product embodied on computer readable media of claim 25 wherein the maximum cost is not exceeded by any path through the tree.

27. The computer program product embodied on computer readable media of claim 24 wherein summed costs of data element accesses exceeds an allowable maximum tree cost sum.

28. The computer program product embodied on computer readable media of claim 19 wherein obtained test configuration information comprises a root data type with plural fields including a left field and a right field, and a field access cost of a same data type is varied based on whether the same data type is accessed by the left or right field.

* * * * *